(12) United States Patent
Mohamed

(10) Patent No.: US 9,103,455 B2
(45) Date of Patent: Aug. 11, 2015

(54) CAGED POPPET VALVE

(75) Inventor: Zahroof Mohamed, Cypress, TX (US)

(73) Assignee: GE Oil & Gas Compression Systems, LLC, Houston, TX (US)

( * ) Notice: Subject to any disclaimer, the term of this patent is extended or adjusted under 35 U.S.C. 154(b) by 797 days.

(21) Appl. No.: 12/525,814

(22) PCT Filed: Feb. 6, 2008

(86) PCT No.: PCT/US2008/053238
§ 371 (c)(1),
(2), (4) Date: Aug. 4, 2009

(87) PCT Pub. No.: WO2008/127763
PCT Pub. Date: Oct. 23, 2008

(65) Prior Publication Data
US 2010/0108163 A1    May 6, 2010

Related U.S. Application Data

(60) Provisional application No. 60/922,933, filed on Apr. 11, 2007.

(51) Int. Cl.
*F16K 15/02* (2006.01)
*F16K 15/06* (2006.01)

(52) U.S. Cl.
CPC .............. *F16K 15/066* (2013.01); *F16K 15/028* (2013.01)

(58) Field of Classification Search
CPC ...... F16K 15/02; F16K 15/028; F16K 15/066
USPC ........... 137/454.2, 454.5, 512.1, 543, 543.19; 251/65, 337
See application file for complete search history.

(56) References Cited

U.S. PATENT DOCUMENTS

| | | | | |
|---|---|---|---|---|
| 469,853 | A * | 3/1892 | Gibson | 137/243.2 |
| 2,223,994 | A * | 12/1940 | Johnson | 137/543.21 |
| 2,369,939 | A * | 2/1945 | Betts | 137/327 |
| 2,697,915 | A * | 12/1954 | Chisholm | 137/73 |
| 3,417,776 | A * | 12/1968 | Milton | 137/512.5 |
| 3,995,658 | A * | 12/1976 | Hager | 137/543 |
| 4,273,153 | A * | 6/1981 | Brown | 137/454.5 |
| 4,368,756 | A * | 1/1983 | Carlson | 137/541 |
| 4,815,493 | A * | 3/1989 | Miller et al. | 137/454.5 |
| 5,193,579 | A * | 3/1993 | Bauer et al. | 137/540 |
| 5,320,136 | A * | 6/1994 | Morris et al. | 137/528 |

(Continued)

FOREIGN PATENT DOCUMENTS

| | | |
|---|---|---|
| AU | 6306169 | 4/1971 |
| EP | 1245881 | 10/2002 |
| WO | WO2005114835 | 12/2005 |

OTHER PUBLICATIONS

PCT International Search Report and Written Opinion for PCT/US2008/53238, dated Jul. 28, 2008.

*Primary Examiner* — John Fox
(74) *Attorney, Agent, or Firm* — Fletcher Yoder, P.C.

(57) ABSTRACT

A novel valve assembly is provided. In one embodiment, the valve assembly includes a seat plate having a plurality of fluid conduits. The valve assembly may also include a plurality of poppet cages. In some embodiments, a poppet cage of such a plurality includes a mounting portion for coupling the poppet cage to the seat plate, and a receiving portion for receiving a poppet therein. Other devices, systems, and methods related to poppet cages are also disclosed.

6 Claims, 6 Drawing Sheets

(56) References Cited

U.S. PATENT DOCUMENTS

| | | | |
|---|---|---|---|
| 5,482,077 A * | 1/1996 | Serafin | 137/516.25 |
| 6,019,125 A * | 2/2000 | Reverberi | 137/454.6 |
| 6,736,161 B2 * | 5/2004 | Kjellander et al. | 137/538 |
| 6,935,364 B1 * | 8/2005 | Tarazona et al. | 137/529 |
| 6,978,801 B2 * | 12/2005 | Takahashi | 137/543.19 |
| 2002/0020451 A1 | 2/2002 | Reid et al. | |

* cited by examiner

CAGED POPPET VALVE

CROSS-REFERENCE TO RELATED APPLICATIONS

This application claims priority to PCT Application No. PCT/US2008/053238 entitled "Caged Poppet Valve", filed on Feb. 6, 2008, which is herein incorporated by reference in its entirety, and which claims priority to U.S. Provisional Patent Application No. 60/922,933, entitled "Caged Poppet Valve", filed on Apr. 11, 2007, which is herein incorporated by reference in its entirety.

FIELD OF THE INVENTION

The present invention relates generally to valve assemblies. More particularly, the present invention relates to a novel poppet valve assembly for use with various flow control systems, including compression systems.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, fluids, such as natural gas and air, have a wide array of uses in industrial and commercial applications. For instance, natural gas may be used to provide power to a range of vehicles, to heat homes during winter, and to operate various consumer appliances, such as ovens or clothes dryers. Further, natural gas may be used to generate electricity for distribution over a power grid, and may be used in the manufacture of an array of products and materials, including glass, steel, and plastics, for example.

In order to meet the demand for natural gas, companies may spend a significant amount of time and resources searching for, extracting, and transporting natural gas. It will be appreciated that natural gas may be produced from oil fields, in which case the gas may be referred to as casinghead gas, or from natural gas fields. As may also be appreciated, transportation of such natural gas, such as through a pipeline from the production site to a consumer, is often facilitated by compression of the gas via a compressor.

One common type of compressor for such applications is the reciprocating compressor. Such reciprocating compressors are positive-displacement devices that generally utilize a crankshaft that is coupled to pistons, via connecting rods and crossheads, to reciprocally drive the pistons and compress a fluid within attached compression cylinders. As may be appreciated by one skilled in the art, natural gas (or some other fluid) is generally introduced into compression chambers of the cylinders through one or more inlet or suction valve assemblies and, following compression, the fluid generally exits the cylinders via one or more outlet or discharge valve assemblies.

Further, one common type of valve assembly is the poppet valve assembly, which traditionally includes a set of poppets disposed between a seat plate and a guard plate. As many compressors routinely operate at hundreds or thousands of rotations per minute (rpm), such poppets also open and close at a similarly high rate. Due to this rapid cycling, the seat plate, the guard plate, and/or the poppets will often wear over time, leading to valve failure if left unchecked. To avoid such failure, a typical, worn poppet valve assembly may need to be repaired or refurbished, such as through replacement of the poppets, machining or refinishing of the seat and/or guard plates, or the like. Of course, such maintenance is often time-consuming and/or costly. Consequently, there is a need for a poppet valve assembly that exhibits an increased durability and life expectancy, and that allows for easier, faster, and cheaper maintenance.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present invention generally relate to a novel poppet valve assembly. In some exemplary embodiments, the valve assembly is a caged poppet valve assembly. In one embodiment, the valve assembly includes a plurality of poppet cage assemblies that are attached to a common seat plate. An exemplary poppet cage assembly of this embodiment may include a single poppet, one or more impact bushings, and one or more biasing members, such as magnets or springs, disposed in a cage. As discussed in greater detail below, such an arrangement may allow individual replacement of components of the valve assembly in an efficient manner. Further, in some embodiments, the use of multiple poppet cage assemblies, instead of a guard plate that is common to all of the poppets, may promote more efficient flow of fluid through the valve assembly.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
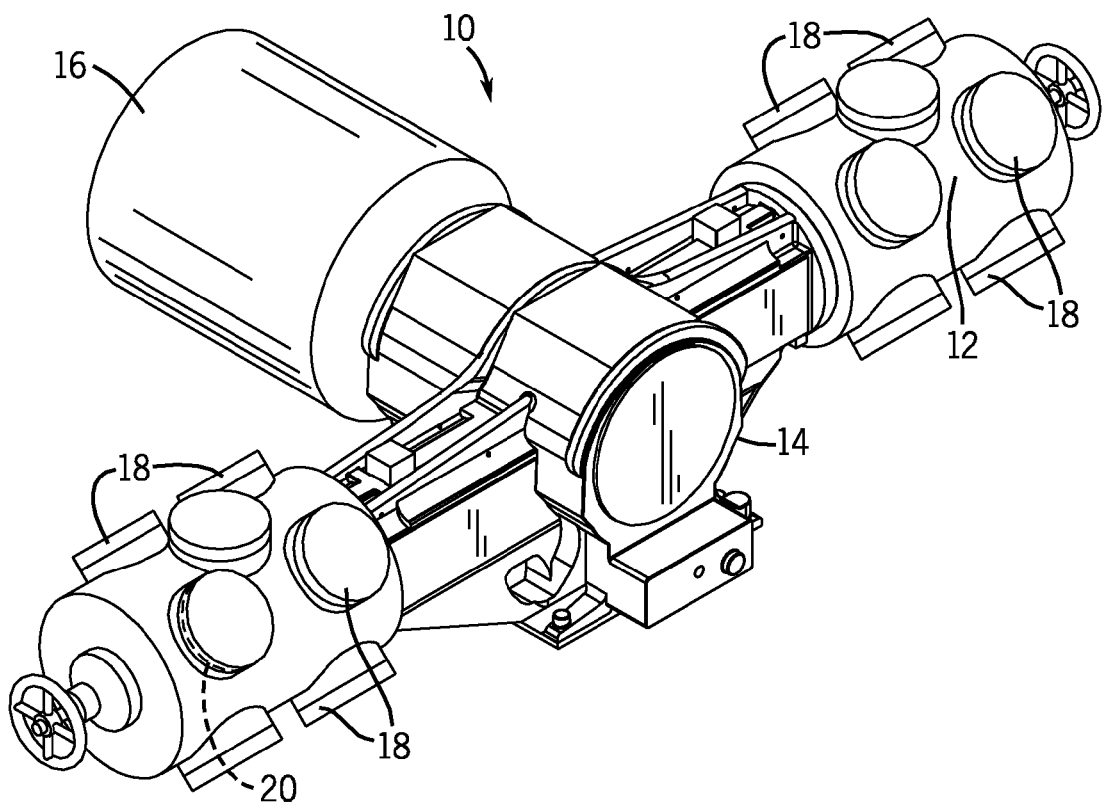
FIG. 1 is a perspective view of a reciprocating compressor including an exemplary valve assembly in accordance with one embodiment of the present invention.

Turning now to the figures, an exemplary compressor 10 is provided in FIG. 1. In the presently illustrated embodiment, the compressor 10 includes a pair of compression cylinders 12 coupled to a frame 14. As discussed in greater detail below, a variety of internal components may be disposed within the cylinders 12 and the frame 14 to enable compression of fluids within the cylinders 12. In one embodiment, the compressor 10 may be utilized to compress natural gas. However, in other embodiments, the compressor 10 may be configured and/or utilized to compress other fluids. A mechanical power source or driver 16, such as an engine or an electric motor, may be coupled to the compressor 10 to provide mechanical power to the various internal components and to enable compression of the fluid within the cylinders 12. To facilitate access to such internal components, as may be desired for diagnostic or maintenance purposes, openings in the frame 14 may be provided and selectively accessed via removable covers disposed over the openings.

Further, the exemplary cylinders 12 include capped recesses 18 configured to receive valve assemblies, such as valve assembly 20. While only a single valve assembly 20 is illustrated, it will be appreciated that, in various embodiments, additional valve assemblies are included within some or all of the other capped recesses 18. It will also be appreciated that the cylinders 12 may include internal fluid conduits between the recesses 18 and the valve assemblies 20 to facilitate flow of a fluid into and out of the cylinders 12 through such valve assemblies. Additionally, various installation components, such as cages or fasteners, may be employed to facilitate mounting of the valve assemblies 20 within the recesses 18.

Although the exemplary compressor 10 is illustrated as a two-throw reciprocating compressor, other compressor configurations may also employ and benefit from the presently disclosed techniques. For instance, in other embodiments, the compressor 10 may include a different number of cylinder throws, such as a four-throw compressor, a six-throw compressor, a couple-free reciprocating compressor, a screw compressor, or the like. Further, other variations are also envisaged, including variations in the length of stroke, the operating speed, and the size, to name but a few.

Figure 2:
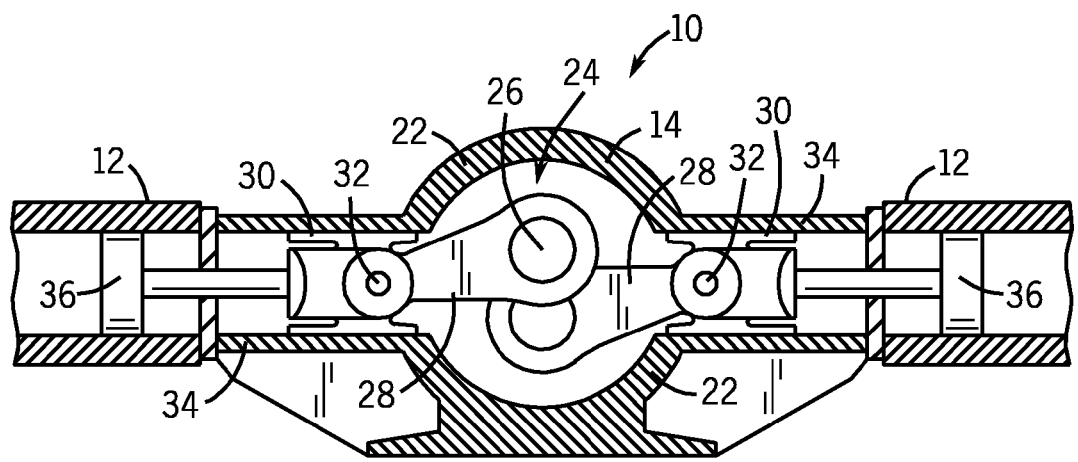
FIG. 2 is an axial cross-sectional view of the exemplary compressor of FIG. 1, illustrating internal components of the compressor in accordance with one embodiment of the present invention.

A cross-sectional view of the exemplary compressor 10 is provided in FIG. 2, which illustrates a number of exemplary internal components of the compressor of FIG. 1. In the presently illustrated embodiment, the frame 14 of the exemplary compressor 10 includes a hollow central body or housing 22 that generally defines an interior volume 24 in which various internal components may be received, such as a crankshaft 26. In one embodiment, the central body 22 may have a generally curved or cylindrical shape. It should be noted, however, that the central body 22 may have other shapes or configurations in full accordance with the present techniques.

In operation, the driver 16 rotates the crankshaft 26 supported within the interior volume 24 of the frame 14. In one embodiment, the crankshaft 26 is coupled to crossheads 30 via connecting rods 28 and pins 32. The crossheads 30 are disposed within crosshead guides 34, which generally extend from the central body 22 and facilitate connection of the cylinders 12 to the compressor 10. In one embodiment, the compressor 10 includes two crosshead guides 34 that extend generally perpendicularly from opposite sides of the central body or housing 22, although other configurations are also envisaged. As may be appreciated, the rotational motion of the crankshaft 26 is translated via the connecting rods 28 to reciprocal linear motion of the crossheads 30 within the crosshead guides 34.

As noted above, the cylinders 12 are configured to receive a fluid for compression. The crossheads 32 are coupled to pistons 36 disposed within the cylinders 12, and the reciprocating motion of the crossheads allows compression of fluid within the cylinders 12 via the pistons 36. Particularly, as a piston 36 is driven forward (i.e., outwardly from central body 22) into a cylinder 12, the piston 36 forces fluid within the cylinder into a smaller volume, thereby increasing the pressure of the fluid. A discharge valve, such as valve assembly 20, may then open to allow the pressurized or compressed fluid to exit the cylinder 12. The piston 36 may then stroke backward, and additional fluid may enter the cylinder 12 through an inlet valve, which may also comprise a valve assembly 20, for compression in the same manner described above. Further, as will be appreciated, the cylinders 12 can be configured to facilitate fluid compression on both the forward and the backward strokes of the piston 36. For instance, as the piston 36 moves forward in the manner discussed above to compress fluid on one side of the piston, additional fluid may be introduced into the cylinder on the opposite side of the piston. Such fluid would then be compressed on the backward stroke of the piston 36.

Figure 3:
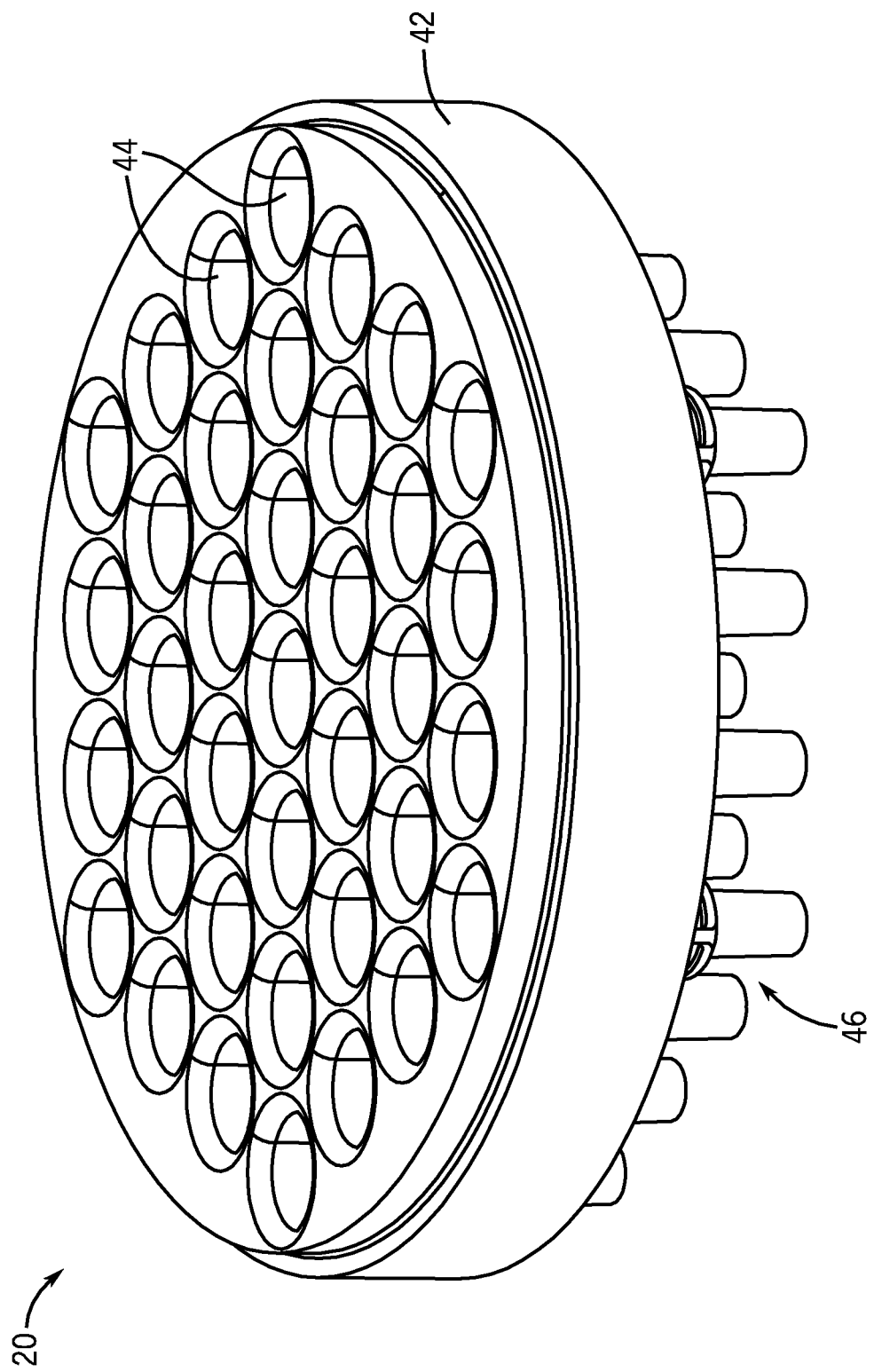
FIG. 3 is a perspective view of an exemplary poppet valve assembly in accordance with one embodiment of the present invention.

A perspective view of an exemplary valve assembly 20 is provided in FIG. 3. In this embodiment, the valve assembly 20 includes a seat plate 42 having a number of fluid ports 44, which allow a fluid, such as natural gas, to flow through the valve assembly 20. The seat plate 42 is formed from metal, or some other suitable high-strength material. As discussed in greater detail below, the exemplary valve assembly 20 also includes a plurality of poppet cage assemblies 46 coupled to the seat plate 42 that selectively control the flow of a fluid through the fluid ports 44.

Figure 4:
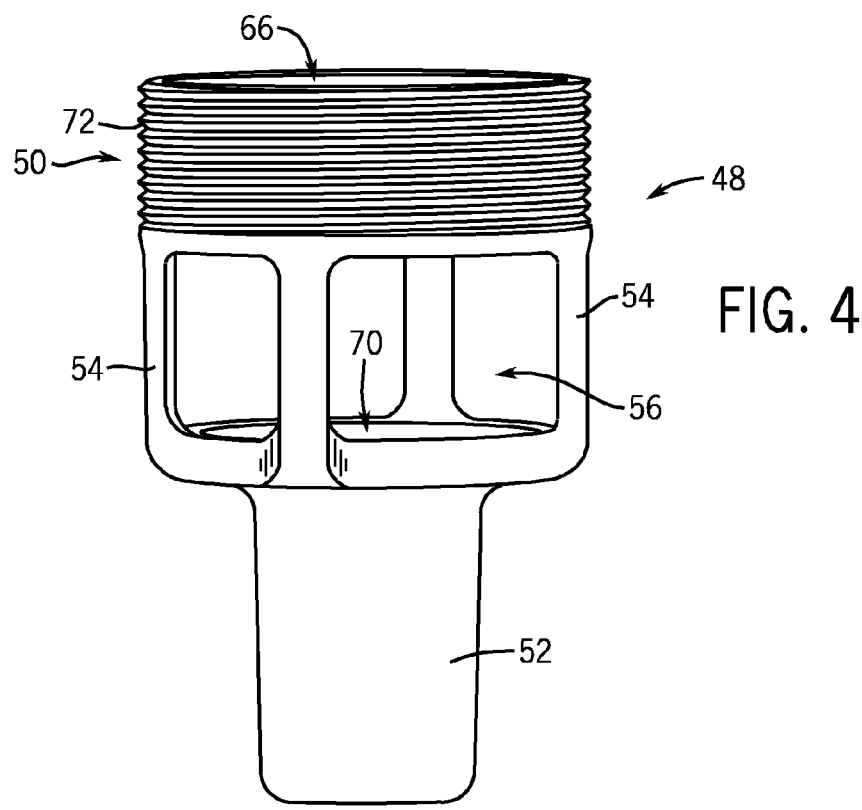
FIG. 4 is a front elevational view of an exemplary cage of the poppet valve assembly of FIG. 3 in accordance with one embodiment of the present invention.
Figure 5:
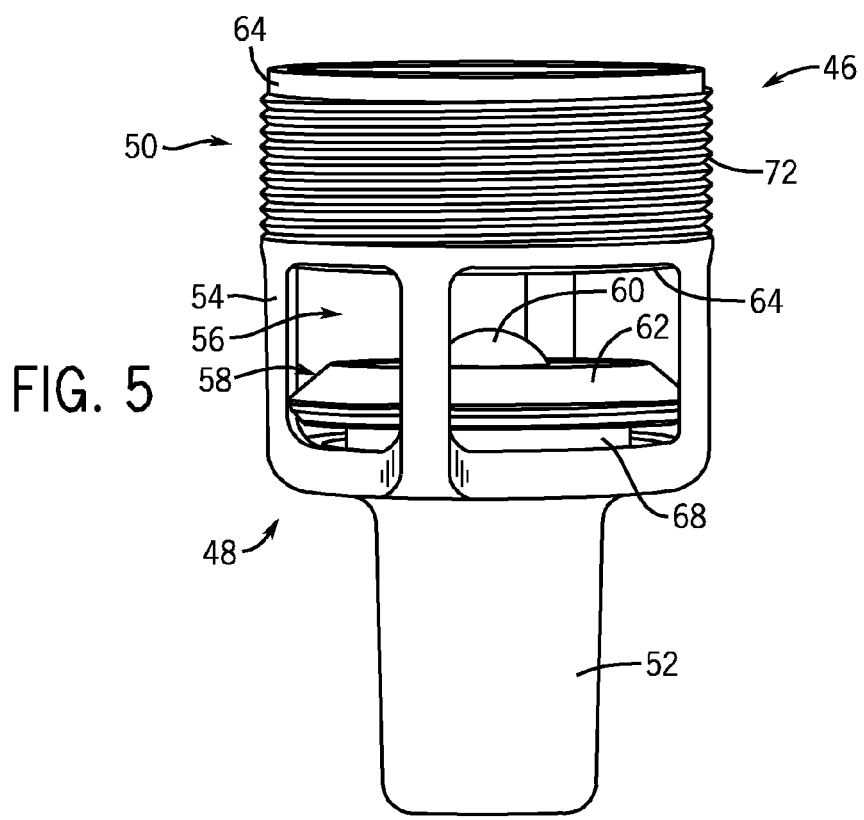
FIG. 5 is a front elevational view of an exemplary poppet cage assembly of the valve assembly of FIG. 3, in which the exemplary poppet cage assembly includes several components disposed within the cage of FIG. 4 in accordance with one embodiment of the present invention.

Certain features of the poppet cage assemblies 46 may be better understood with reference to FIGS. 4 and 5. Particularly, FIG. 4 is a front elevational view of a poppet cage 48 alone, while FIG. 5 is a front elevational view of a poppet cage assembly 46 removed from the seat plate 42 and including a number of components disposed within the cage 48, in accordance with one embodiment of the present invention. The cage 48 includes a mounting portion 50 and a receiving portion 52 that includes one or more connecting arms 54. In certain embodiments, the cage 48 is formed from metal, although the cage 48 may be formed from other suitable materials in other embodiments. Additionally, the cage 48 may be formed through any suitable manufacturing process. For instance, in one embodiment, a metallic cage 48 is formed through a metal injection molding process.

The mounting portion 50, the receiving portion 52, and the connection arms 54 generally define an interior space 56 in which a poppet 58 may be disposed. In some embodiments, such as the embodiment illustrated in FIGS. 4 and 5, each cage 48 is configured to receive only a single poppet 58 therein. In other embodiments, however, the cage 48 may receive multiple poppets 58. In the presently illustrated embodiment, the poppet 58 includes a central body 60 coupled to a poppet head 62. In certain embodiments, the poppet head 62 is formed from metal through a suitable manufacturing process, such as coining, stamping, machining, or the like. Further, in some embodiments, the central body 60 is an injection molded plastic. It should be noted, however, that one or both of the central body 60 and the poppet head 62 may be formed from other suitable materials, such as ceramic, metal, or plastic, or through other suitable manufacturing processes, other than those described above.

The exemplary poppet cage assembly 46 also includes an impact bushing 64 disposed within a bore 66 of the mounting portion 50, and an impact bushing 68 disposed in a recess 70 of the receiving portion 52. As discussed in greater detail below, during operation of the poppet cage assembly 46, the poppet head 62 will contact the impact bushing 64 while closing, and contact impact bushing 68 upon opening. The impact bushings 64 and 68 may be formed from the same material as each other, or from different materials. In some embodiments, the one or more materials from which the impact bushings are formed are selected based on their impact absorption properties. For instance, in one embodiment, the impact bushings 64 and 68 are made of plastic, and may be formed through an injection molding process or by some other suitable manufacturing process. As will be appreciated, however, these impact bushings 64 and 68 may be formed from suitable materials other than plastic. For instance, in some embodiments, such as an embodiment including a reinforced plastic poppet head 62, it may be desirable for the impact bushing 64 to be formed of metal. Also, in some embodiments, the one or more materials from which the impact bushings 64 and/or 68 are formed has a strength and/or stiffness less than that of the poppet head 62 to reduce wear on the poppet 58 during operation of the valve assembly 20.

Advantageously, in the presently illustrated embodiment, the poppet cage assembly 46 is configured to facilitate efficient servicing of one or more of the components of the assembly. Notably, the presently disclosed embodiment allows for each of the cage 48, the poppet 58, the impact bushing 64, the impact bushing 68, and/or other components, such as magnets 80 and 82 (FIG. 6) or spring 100 (FIG. 8), to be replaced individually, without requiring replacement of the entire poppet cage assembly 46. For instance, over time, one or both of the impact bushings 64 and 68 may exhibit wear from repeated contact with the poppet 58. In such a case, the individual poppet cage assembly 46 may be removed from the seat plate 42, the poppet 58 and worn impact bushings 64 and/or 68 may be removed from the cage 48, and the poppet 58 may be reinstalled with new impact bushings 64 and/or 68. Further, in some embodiments, because a seal is formed between the poppet 58 and the impact bushing 64, the inclusion of an impact bushing 64 reduces or eliminates the need to finish (or refinish) the seat plate 42 in order to facilitate sealing of the seat plate 42 directly with the poppet 58. The refurbished poppet cage assembly 46 may then be reattached to the seat plate 42 and the valve assembly 20 may be placed back into service. Also, in some embodiments, the cage 48 includes a threaded surface 72 to facilitate simple attachment and removal of the cage 48 from the seat plate 42, further enhancing the ease with which the valve assembly 20 may be assembled and maintained.

It should also be noted that while certain embodiments of the valve assembly 20 may comprise the seat plate 42 and one or more poppet cage assemblies 46 in addition to other components, other embodiments in accordance with the present techniques may consist of, or consist essentially of, the seat plate 42 and the one or more poppet cage assemblies 46. Similarly, while a poppet cage assembly 46 of some embodiments may comprise other components in addition to the cage 48, the poppet 58, the impact bushings 64 and 68, the magnets 80 and 82, and/or the spring 100, in other embodiments the poppet cage assembly 46 consists of, or consists essentially of, these elements or some sub-combination thereof. Further, while certain embodiments of the valve assembly 20 include a plurality of poppet cage assemblies 46, it should be noted that other embodiments may instead include only a single poppet cage assembly 46 in full accordance with the present techniques.

Figure 6:
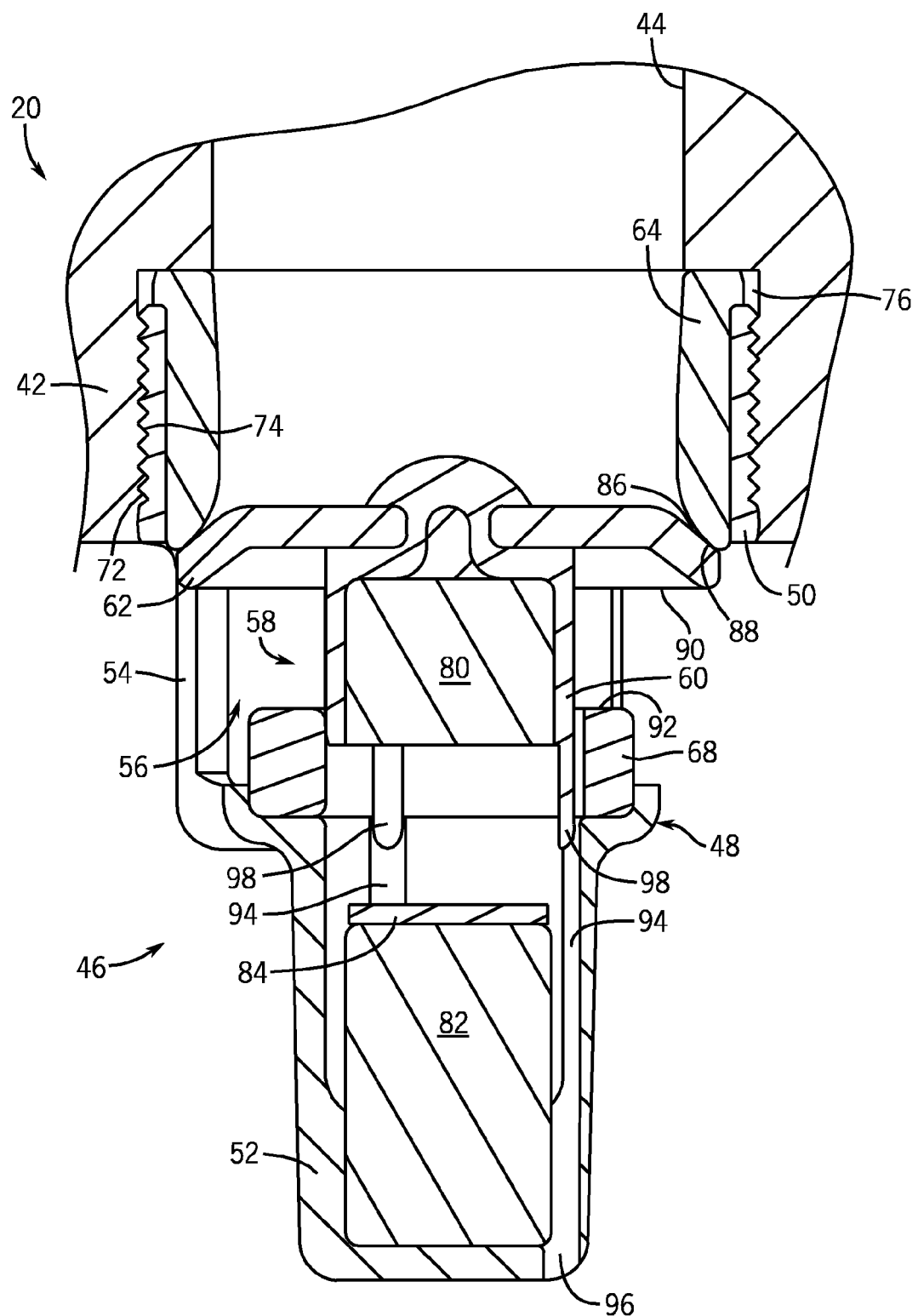
FIG. 6 is a partial cross-sectional view of the exemplary valve assembly of FIG. 3, illustrating various internal components of the valve assembly, including a poppet located in a closed position in accordance with one embodiment of the present invention.
Figure 7:
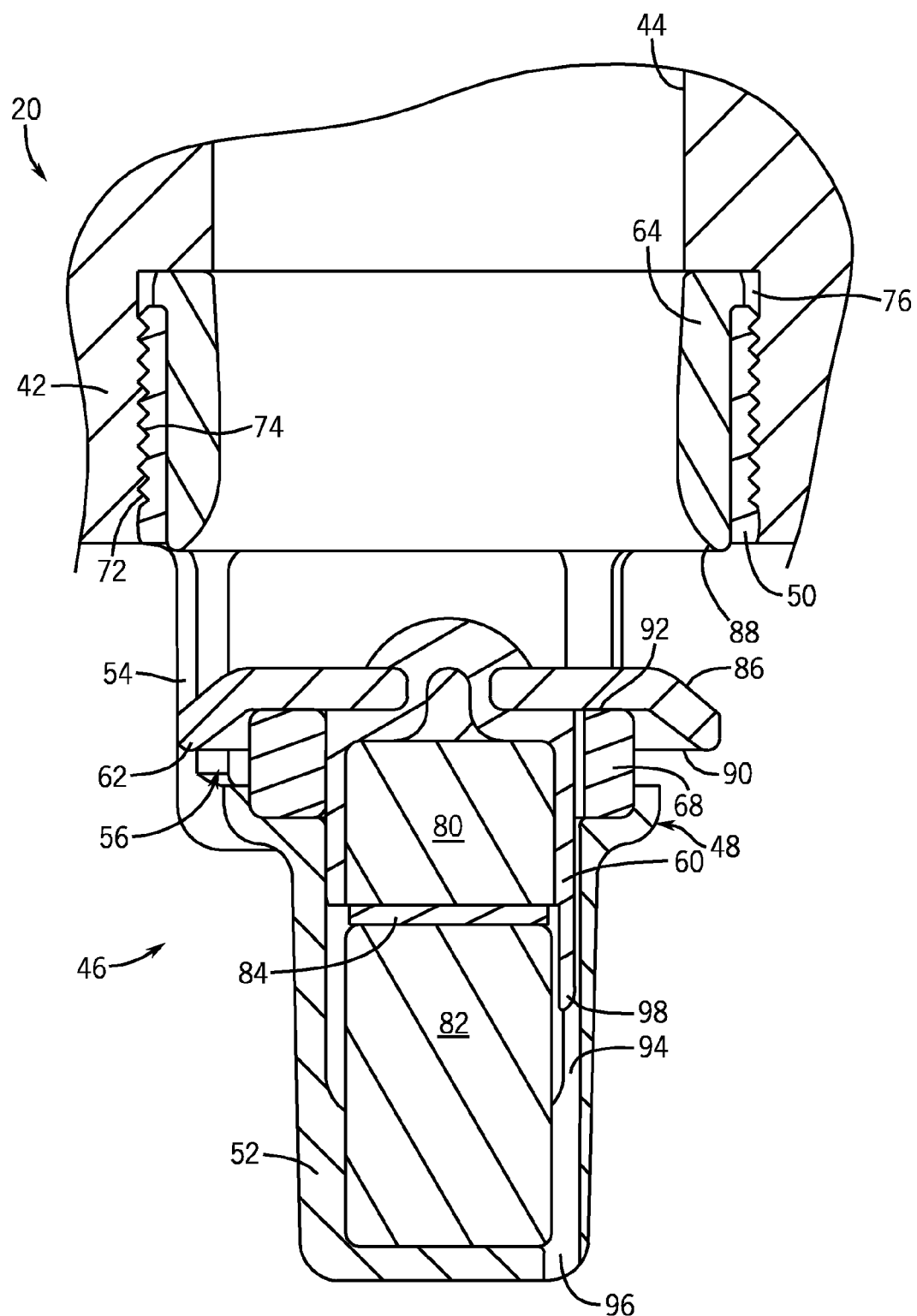
FIG. 7 is a partial cross-sectional view of the exemplary valve assembly illustrated in FIG. 6, depicting the poppet in an open position in accordance with one embodiment of the present invention.
Figure 8:
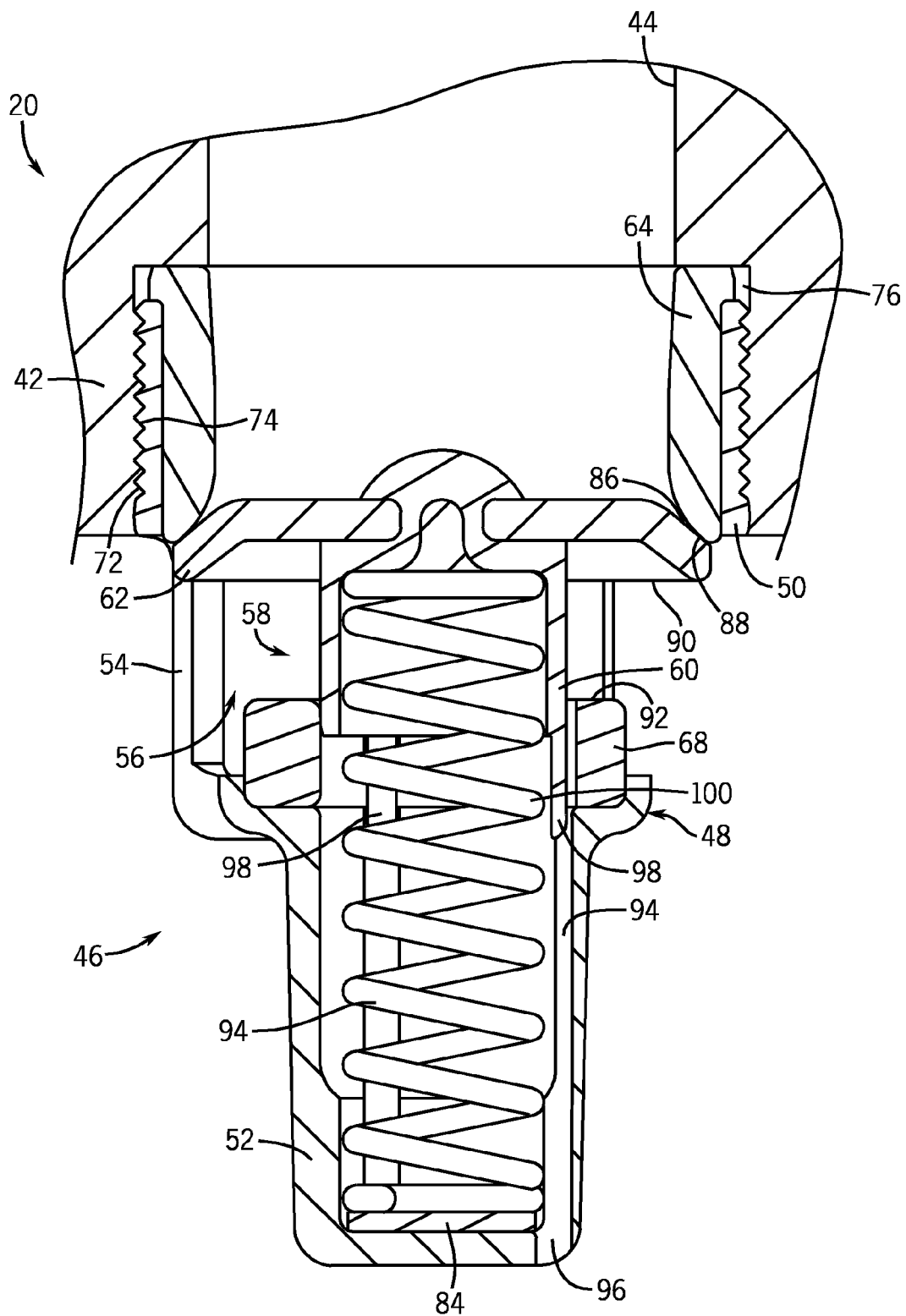
FIG. 8 is a partial cross-sectional view of the exemplary valve assembly of FIG. 3, which includes a biasing spring in accordance with one embodiment of the present invention.

Additional features of an exemplary valve assembly 20 are illustrated in the cross-sectional views of FIGS. 6-8. In the presently illustrated embodiment, the seat plate 42 includes a recess 76 formed at an end of a fluid port 44 and is configured to receive a poppet cage assembly 46. In some embodiments, the recess 76 is concentric, or substantially concentric, with the fluid port 44 to facilitate flow of a fluid from the fluid port 44, through the impact bushing 64, and into the region 56 when the poppet 58 is opened. In some embodiments, the recess 76 includes a threaded surface 74 configured to engage the threaded surface 72 of the cage 48. Other or additional attachment mechanisms, however, could be provided in full accordance with the present techniques. For instance, in various embodiments, the seat plate 42 may include externally threaded extensions configured to receive internally threaded mounting portions 50 of cages 48, the cages 48 may be coupled to the seat plate 42 via a fastener, or the like. Additionally, while the mounting portion 50 of the cage 48 is directly coupled to the seat plate 42 in certain embodiments, the mounting portion 50 of other embodiments may be coupled to the seat plate 42 via one or more intermediate members, such as a nipple fitting.

It should also be noted that, in some embodiments, the use of poppet cage assemblies 46 with the seat plate 42 allows the valve assembly 20 to be assembled and operated without a guard plate, further reducing the manufacturing and maintenance costs of such valve assemblies 20. Additionally, it will be appreciated that the exclusion of a conventional guard plate may also reduce the manufacturing cost associated with production of the seat plate 42, such as by eliminating the need to machine the seat plate 42 for coupling to the guard plate. Still further, in a traditional poppet valve assembly, the guard plate has a number of fluid ports that allow fluid to flow through the guard plate. The body of the guard plate in the traditional poppet valve assembly, however, somewhat impedes such flow, as fluid can only pass through the body via the fluid ports. Conversely, in some embodiments of the present invention, the use of individual poppet cage assemblies 46, rather than a conventional guard plate, reduces the amount of material impeding the flow of fluid through the valve assembly 20, and results in lower resistance and higher efficiency than conventional poppet valve assemblies.

As will be appreciated, a poppet valve generally includes one or more biasing components configured to apply a biasing force to the poppet 58. In the embodiment illustrated in FIGS. 6 and 7, magnets 80 and 82 are disposed in the poppet 58 and the receiving portion 52 of the cage 48 to provide such a biasing force. As may be seen in the presently illustrated embodiment, a button or washer 84 may be provided within the receiving portion 52 of the cage 48 to prevent contact between the magnets 80 and 82. The button 84 may be formed of plastic or some other suitable material. In other embodiments, the magnets 80 and 82 may be supplemented by, or omitted in favor of, some other biasing component, such as the spring 100, as illustrated in FIG. 8. It should be noted that the spring 100 is illustrated in its entirety, rather than in section, for the sake of clarity. In such an embodiment, the button 84 may be positioned in the base of the cage 48.

In operation, the opposing forces on the magnets 80 and 82 generally result in a force on the poppet 58 toward the impact bushing 64. Conversely, an opposing force will be applied to the poppet 58 when the pressure above the poppet head 62 (i.e., the region within the fluid port 44 and the impact bushing 64) exceeds the pressure in the region 56 below the poppet head 62. As will also be appreciated, when the biasing force is greater than the opposing force, an upper surface 86 of the poppet head 62 will generally engage a complimentary surface 88 of the impact bushing 64 to form a seal between these two surfaces, as illustrated in FIG. 6. Upon a sufficient pressure differential between the region within the impact bushing 64 and the region 56, the opposing force resulting from such pressure differential will exceed the biasing force applied by the magnets 80 and 82 (or the spring 100), as well as any frictional forces, causing the poppet 58 to move into the open position illustrated in FIG. 7 and allowing fluid to flow from the fluid port 44, through the impact bushing 64, and past the poppet cage assembly 46. In this position, a lower surface 90 of the poppet head 62 abuts a surface 92 of the impact bushing 68. It should be noted, however, that in other embodiments the stem or skirt of the central body 60 of the poppet 58 may be configured to impact the button 84 when the poppet 58 moves into an open position. Such contact between the central body 60 and the button 84 may be in addition to, or instead of, contact between the poppet head 62 and an impact bushing 68.

Additionally, internal channels or grooves 94 may be formed on interior surfaces of the cage 48 and the impact bushing 68 to allow a fluid entering a lower portion of the cage 48 to escape through the grooves 94 and a vent port 96. Still further, in one embodiment, the central body 60 of the poppet 58 includes one or more anti-rotation features, such as fins 98, which cooperate with the channels 94 to prevent rotation of the poppet 58 within the poppet cage assembly 46. In alternative embodiments, the central body 60 may include other anti-rotation features in place of, or in addition to, the fins 98. For example, the central body 60 may instead include one or more grooves configured to mate with internally protruding ribs formed on the impact bushing 68 and/or the cage 48.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A valve assembly comprising:
a seat plate including a plurality of fluid conduits;
a plurality of poppet cages, wherein each poppet cage of the plurality of poppet cages comprises a mounting portion coupled to the seat plate proximate a respective fluid conduit of the plurality of fluid conduits, and a receiving portion having a poppet and a biasing element, wherein the biasing element provides a biasing force against the poppet and is surrounded by a central body of the poppet, and wherein the receiving portion comprises one or more connecting arms and a vent port, wherein the connecting arms couple to the mounting portion to form radial apertures, and wherein the vent port is axially offset away from the radial apertures, and a passage extends axially between and couples to the vent port and at least one of the radial apertures;
a first plastic impact bushing disposed within the mounting portion of each poppet cage of the plurality of poppet cages, wherein the first plastic impact bushing has a first surface configured to cooperate with a first mating surface of the poppet to form a seal therebetween when the poppet is in a closed position; and
a second plastic impact bushing disposed within the receiving portion of each poppet cage of the plurality of poppet cages, wherein the second plastic impact bushing has a second surface configured to abut a second mating surface of the poppet when the poppet is in an open position.

2. A valve assembly comprising:
a seat plate comprising a plurality of fluid conduits; and
a plurality of poppet cages, wherein each poppet cage of the plurality of poppet cages comprises a mounting portion coupled to the seat plate, and a receiving portion having an interior region supporting a poppet and a biasing element, wherein the receiving portion comprises a vent port and one or more connecting arms that couple to the mounting portion to form radial apertures, wherein the vent port is axially offset away from the radial apertures, wherein a passage extends axially between and couples to the vent port and at least one of the radial apertures, wherein the poppet comprises a central body that extends around the biasing element;
a first plastic impact bushing disposed within the mounting portion of each poppet cage of the plurality of poppet cages, wherein the first plastic impact bushing has a first surface configured to cooperate with a first mating surface of the poppet to form a seal therebetween when the poppet is in a closed position; and a second plastic impact bushing disposed within the receiving portion of each poppet cage of the plurality of poppet cages, wherein the second plastic impact bushing has a second surface configured to abut a second mating surface of the poppet when the poppet is in an open position;

wherein the valve assembly enables fluid flow through the poppet cages in a main fluid flow path that receives a fluid through the mounting portion before redirecting the fluid out of the poppet cages through the radial apertures formed by the connecting arms during operation of the valve assembly.

3. The valve assembly of claim 2, wherein the central body comprises a fin that mates with a groove in the receiving portion.

4. The valve assembly of claim 2, wherein the biasing element comprises at least one magnet.

5. The valve assembly of claim 2, wherein the first plastic impact bushing is configured to be captured between the seat plate and the mounting portion.

6. The valve assembly of claim 2, wherein the second plastic impact bushing axially abuts the central body of the poppet and the receiving portion.

\* \* \* \* \*